June 28, 1955 R. F. MINER 2,711,611
GUARD FOR FISHHOOKS AND THE LIKE

Filed Jan. 19, 1953

INVENTOR.
Raymond F. Miner,
BY
Attys.

United States Patent Office

2,711,611
Patented June 28, 1955

2,711,611
GUARD FOR FISHHOOKS AND THE LIKE

Raymond F. Miner, West Branch, Iowa

Application January 19, 1953, Serial No. 331,774

1 Claim. (Cl. 43—57.5)

This invention relates to a guard device and more particularly to a guard for use in conjunction with gang-type fishhooks.

It is the general object of this invention to produce a new and improved guard of the type described.

A number of fishing baits are equipped with gang-type hooks, that is a hook wherein two or more individual fishhooks are secured to each other to form a single multiple pointed hook. Probably the most common form of gang-type hook is the treble hook wherein three equally spaced hooks are secured together as a unit and the unit itself is attached to the bait. In certain plugs two, three and even more treble hooks may be attached to the body in an effort to ensure hooking of every strike. While the use of gang-type hooks is believed to increase the possibility of hooking a striking fish, the multiplicity of points on a bait equipped with one or more treble hooks makes the bait exremely difficult to transport even in a tackle box because of its tendency to snag every other article of fishing equipment in the box and in addition renders the bait almost dangerous to carry in the pocket or the hand.

The occasion often arises wherein a fisherman may desire to make a long trip on foot to reach a particularly desirable fishing spot and in so doing would prefer to make the trip without being burdened with a heavy tackle box carrying plugs and other gang hook equipped lures. Unless some means are provided for guarding the hooks of the plugs, however, it would be extremely difficult if not impossible for the fisherman to remove a plug from a pocket of a fishing jacket or trousers should he attempt to transport his baits in this fashion.

According to this invention, however, there is provided a guard for gang-type hooks which is readily positioned over the hook so as to guard the points thereof so that a lure having gang hooks provided with the guard of this invention may easily be carried in the pocket without danger of having the hooks inextricably ensnarled in the pocket material. Furthermore, lures may be more advantageously carried in a tackle box if provided with the guard of this invention inasmuch as when so provisioned the normal danger of snarling or snagging with other paraphernalia in the box is substantially eliminated.

Therefore one of the principal features of this invention is the provision of a guard for gang-type fishhooks which is readily placed in guarding position over the gang hook and is equally readily removed and yet which quite effectively guards the hooks against snagging so that a lure so equipped may readily be carried in the pocket without danger of catching on the lining of the pocket and may more easily be carried in the tackle box without danger of snagging other equipment in the box.

Other and further features of the invention will be readily apparent from the following description and drawings, in which.

Figure 1:
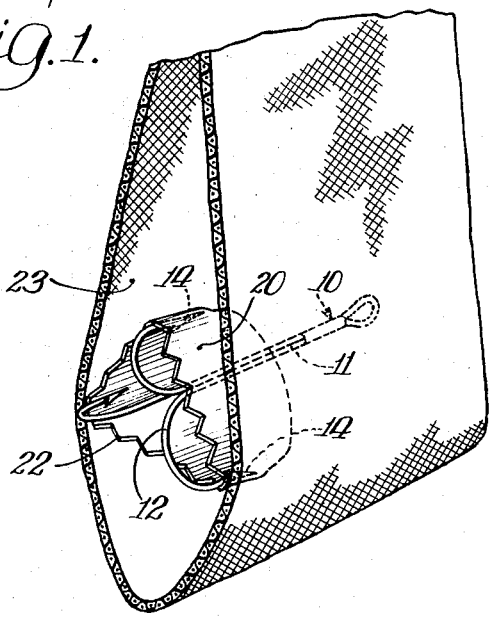
Fig. 1 is a sectional view showing a gang-type treble hook carried in a pocket or other container and provided with the device of this invention.
Figure 2:
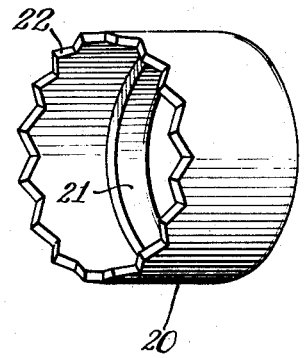
Fig. 2 is an isometric elevational view of the guard of this invention.
Figure 3:
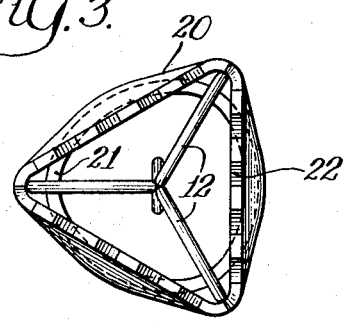
Fig. 3 is an elevational view of one end of the guard showing the same in position on a treble gang fishhook.
Figure 4:
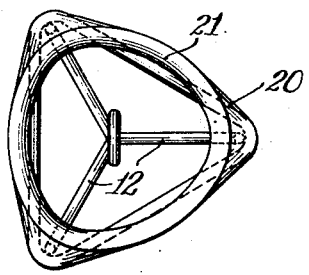
Fig. 4 is a view like Fig. 3 showing the other end of the guard.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claim.

Referring now to the drawings, a common type gang hook is a treble hook, such as the hook 10, which is provided with a shank portion 11 extending linearly for a short distance and then curving into three separate bights 12 to form the individual fishhooks 13. The hooks 13 are each provided with a point 14 and a substantially lineal section 15 extending between the points and beginning of the bight portions.

The guard of this invention comprises an annular band 20 of resilient material, preferably rubber, which is formed with an integral thickened portion 21 around one marginal edge thereof, with the opposite edge 22 serrated as shown. The band is made so as to have a radius less, and preferably just slightly less, than the distance from the shank of the hook to the points of the hook.

Figure 5:
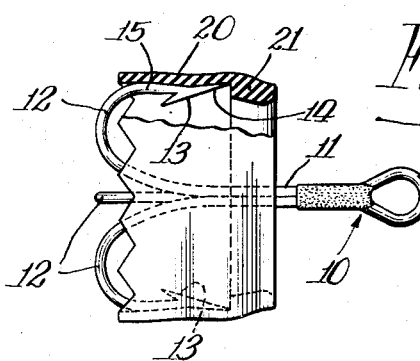
Fig. 5 is a side elevation, partially broken away showing the guard in position over a treble or gang hook.

When used, the band of the invention is stretched slightly by the fingers of the operator and slipped upwardly over the bight portions 12 and lineal portions 15 of the fishhooks until the thickened portion 21 has just passed the points 14 of the hooks, that is, until the guard has been brought to the position shown in Fig. 5. When so positioned the hook may be dropped into a pocket, such as the pocket 23, and carried without difficulty. Normally of course the hook would be attached to a fish bait of some sort such as a plug or bucktail fly. It will be noted that the width of the band is slightly greater than the length of the lineal portion 15 of the fishhooks, and when properly positioned guards the points of the hooks against snagging on adjacent articles or material. The guard may be readily removed merely by grasping the band adjacent one point of the hook and pulling it rearwardly.

Clearly if the lure to be carried is equipped with two or more gang-type hooks, the guard member of this invention should be provided for each of the gangs and a lure so provisioned may be carried in the hand or in the pocket or tackle box without danger of snagging. Preferably the guard is made of rubber so that it possesses the requisite resiliency to enable it to be stretched into position over the gang, and if the rubber be of good stretchable quality the guard may be made in a single small size which may be stretched to cover all sizes of gang hooks.

I claim:

A guard for a treble gang fishhook comprising a cylindrical open ended band having a radius slightly less than the distance from the shank of the fishhook to the points of the hook, an integral thickened portion on the inside of one of the marginal edges of the band, said band having a width, exclusive of said thickened portion, greater than the length of the barbed portion of the hooks, said band being of rubbery material whereby it may be stretched to encircle and resiliently grasp the gang with the thickened portion overlying the points of the hooks and with the remaining portion of the band overlying said barbed portion of the hooks, the outer wall surface of said band being free of projection and the thickened portion constituting a stop against which the points of the hooks bear.

References Cited in the file of this patent

UNITED STATES PATENTS

| | | |
|---|---|---|
| 2,204,185 | Lougheed | June 11, 1940 |
| 2,241,367 | Sarff | May 6, 1941 |
| 2,332,400 | Richardson | Oct. 19, 1943 |
| 2,339,187 | Pain | Jan. 11, 1944 |
| 2,685,756 | Mowbray | Aug. 10, 1954 |

FOREIGN PATENTS

| | | |
|---|---|---|
| 628,485 | France | June 28, 1927 |